United States Patent [19]

Waight et al.

[11] 3,874,404
[45] Apr. 1, 1975

[54] CHECK VALVE

[75] Inventors: William J. Waight, Reseda, Calif.;
John A. Williams, Phoenix, Ariz.;
Louis C. Garday, deceased, late of
Woodland, Calif.; **Johnnie A.
Garday, legal representative,**
Somerton, Ariz.

[73] Assignee: Lockheed Aircraft Corporation,
Burbank, Calif.

[22] Filed: Apr. 5, 1973

[21] Appl. No.: 348,252

[52] U.S. Cl. ............................... 137/493, 137/490
[51] Int. Cl. ............................................. F16k 31/12
[58] Field of Search ........ 137/490, 491, 493.1, 493,
137/493.2, 493.8, 494, 485, 526, 489.5, 511,
455, 512; 251/61, 489.5, 511, 455, 282

[56] References Cited
UNITED STATES PATENTS

| | | | |
|---|---|---|---|
| 2,665,708 | 1/1954 | Ghormley | 137/493 |
| 2,759,488 | 8/1956 | Garrett et al. | 137/491 |
| 2,925,824 | 2/1960 | Rockwell | 137/490 |
| 3,047,011 | 7/1962 | Wright et al. | 137/490 |
| 3,272,227 | 9/1966 | Williams | 137/491 |
| 3,307,575 | 3/1967 | Dickinson et al. | 137/491 |
| 3,692,050 | 9/1972 | Deters | 137/491 |

*Primary Examiner*—Martin P. Schwadron
*Assistant Examiner*—Robert J. Miller
*Attorney, Agent, or Firm*—Billy G. Corber; Frank L. Zugelter; Lowell G. Turner

[57] ABSTRACT

A valve functioning as a check valve in normal operation, but which provides a reverse flow of fluid should a vacuum or cavitation of fluid occur in a hydraulic line in which the valve is mounted. A passageway through a pilot valve provides communication between an inlet port and one side of a sensing diaphragm disposed in a control chamber, while the chamber on the other side of the diaphragm is referenced to atmosphere. A poppet valve is slidably mounted upon the pilot valve and their assembly with the valve housing produces a volumetric spacing or dimension constituting a portion of a fluid flow path extending between an outlet port to the pilot valve but not to the inlet port in normal operation. Should a vacuum or cavitation occur, the sensing diaphragm actuates the pilot valve to dump the pressure in the flow path portion into the passageway and then to the inlet port while pressure on the poppet valve is relieved. The poppet valve opens to provide a reverse flow of fluid. Should a rupture occur in the hydraulic line, the poppet valve seats to prevent reverse flow of fluid to the rupture.

9 Claims, 3 Drawing Figures

CHECK VALVE

BACKGROUND OF THE INVENTION

1. Field of the Invention

The field of art to which the invention is most likely to pertain may be located in classes of devices generally relating to valves and fluid flow devices.

2. The Prior Art

Examples of prior art devices in the arts to which this invention most likely pertains are U.S. Pat. Nos. 2,302,284; 2,719,611; 2,737,200, 2,989,073; and 3,012,569.

PROBLEMS IN PRACTICE OF THE ART

A problem arises in the hydraulic system for aircraft landing gear when a power-off downward acceleration or swing of its landing gear occurs. This occurrence may be triggered by rupture in a hydraulic line, cavitation or vacuum in the line during landing gear activation, or during power-off situations developed in emergencies purposefully created (such as emergency practice runs for the aircraft) or otherwise. The occurrence of cavitation in the landing gear hydraulic apparatus may result because of a negative pressure in the void resulting from such an acceleration or swing. Or, as the landing gear hydraulic apparatus must inhale fluid as it extends, a vacuum may be generated in the hydraulic line.

In the instance of a rupture occurring in the hydraulic return line for any reason, it is desired that activation of the landing gear not be initiated by its usual acutating mechanisms and systems. A reverse flow of fluid in the return line would be lost through the rupture. On the other hand, in the first noted problem, reverse flow is desired and advantageous where a cavitation or a vacuum is developed.

The invention, illustratively embodied in a single device, solves the above-noted problems effectively and efficiently.

SUMMARY OF THE INVENTION

The invention relates to check valves, and is more particularly related to a valve which checks or controls flow of fluid in a hydraulic line in normal operation of the system, while also controlling or stopping the flow of fluid in the event of a vacuum (cavitation) or rupture occurring in such system.

An object of this invention is to eliminate damaging consequences that may arise from cavitation or vacuum in a main landing gear hydraulic return line.

Another object of this invention is to provide a reversal of flow of fluid through such return line in the event of a cavitation or vacuum occurring.

A further object of this invention is to prevent loss of fluid in a hydraulic line in the event of a rupture therein.

Still another object of this invention is to provide adaptability of alternate designs or configurations which nevertheless accomplish the same results comprehended within the scope of this invention.

A further object of this invention is to prevent chattering and hysteresis in the check valve device, and which disadvantages have been associated with this type of device.

These and other objects and advantages of the invention will become more fully apparent upon a full and complete reading of the following description taken together with the appended claims and the accompanying drawing comprising one sheet.

DESCRIPTION OF THE PREFERRED EMBODIMENT

Figure 1:
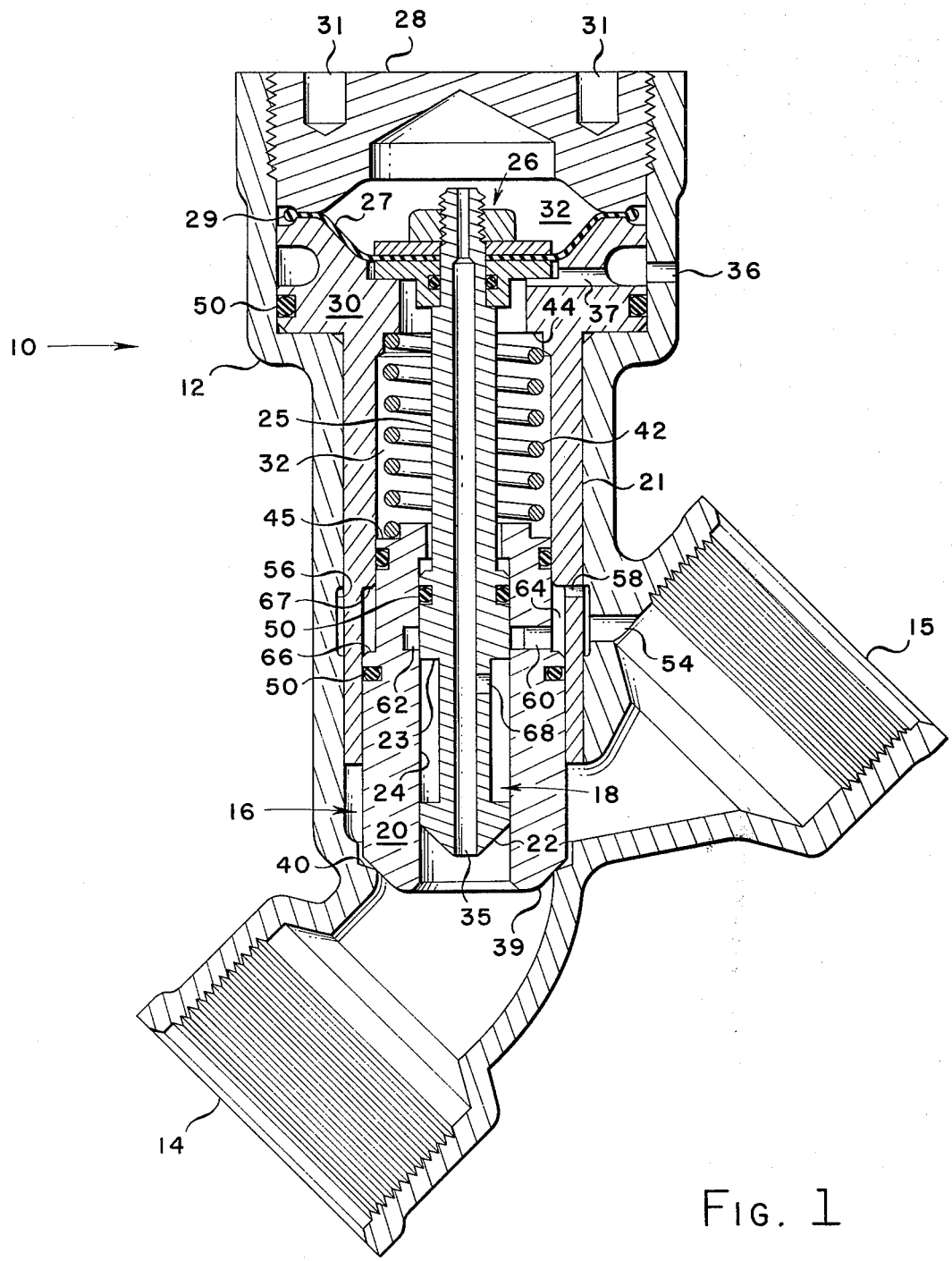
FIG. 1 is a sectional view of a device embodying the invention.

Referring now to the drawing in which reference characters correspond to like numerals hereinafter, reference character 10 (FIG. 1) identifies generally a preferred valve device which incorporates the invention. The device 10 comprises a cylindrical housing 12 having an inlet port 14, an outlet port 15 adapted for direct communication with the port 14, and a valve assembly 16 supported by and disposed within the housing 12. The valve assembly 16 comprises a pilot valve assembly 18 and a poppet valve member 20 in which the pilot assembly 18 is slidably received and mounted. The poppet element is preferably mounted in a guide member 21 suitably retained in a permanent position within or otherwise secured to the housing 12. The pilot assembly 18 includes a spool portion 22 and a piston portion 23, and the assembly 18 is reciprocable in a concentric bore 24 of the poppet member 20. An extension 25 is integrally formed upon the piston portion 23, and a sensing assembly 26, including a diaphragm member 27, is securely mounted to the end of and is in cooperative relation to the extension 25. The sensing assembly 26 is suitably held in place, such as by a closure or retainer member 28 included with the housing 12, and which is preferably shaped as a cylindrical threaded disc. The retainer member 28 is threaded to the housing 12 and clamps a circumferential bead 29, included on the diaphragm member 27, upon one end of the guide member 21. An enlarged head 30 is provided on the one end of the guide 21 so that in the assembly of the device 10, the retainer member 28 may be mated to such guide 21 to permanently position the latter. Spanner wrench holes 31 may be provided in the retainer member 28 to assure a tight mating of that member to the guide 21 and upon the bead 29. Such mating provides the formation of a chamber 32 divided into two cavities one to each side, upper and lower, of the diaphragm member 27.

A passageway 35 is provided in the pilot valve assembly 18 for communication between the inlet port 14 and one of the cavities of the chamber 32, while the other of such cavities is made to vent to the exterior or atmosphere about the device 10. In the instant embodiment, the passageway 35 provides communication between the inlet port 14 and the upper cavity while venting holes 36, 37 in the housing 12 and the guide member 21, respectively, provide communication between atmosphere and the lower cavity.

The poppet valve member 20 includes peripheral points on its nose or conical surface 39 which are adapted to engage a valve seat 40 (FIGS. 1, 2) provided in the housing 12 between the ports 14, 15, while a spring 42 is provided to bias such member towards or against such seat. Suitable shoulders 44, 45 are formed in the walls of the sleeve 21 and the poppet valve member 20, respectively, and into which the ends of the spring 42 fit, for this purpose. Suitable O-rings are provided at various positions 50 for the usual sealing purposes between the several elements shown in FIG. 1 concommitant with the efficiency of operation of these types of devices.

Means are provided to define an open fluid flow path between the outlet port 15 and the inlet port 14 in structural features of the device 10 other than directly through the valve seat 40. A conduit 54 is provided in the housing 12 to communicate with the outlet port 15. An annulus 56 is cut away in the interior wall of the housing 12. An orifice 58 is provided through the guide member 21. A hole 60 of greater diameter than that of the orifice 58 is included in the poppet valve member 20 for direct communication with an annular groove 62 formed in the interior wall constituting the bore 24 in such member 20. The arrangement of these openings in the assembly of the device 10 provides a volumetric annular dimension 64 which, in cooperative relationship with the poppet valve member 20, provides for the imposition of a force on the latter. In other words, the force and pressure of the fluid in the outlet port 15 is applied to the poppet valve member 20, via the annular dimension 64, as long as the piston portion 23 of the pilot valve member 20 covers the groove 62. In this embodiment, complementary marginal portions in both the poppet valve member 20 and the guide 21 are recessed, as at 66 and 67, respectively, to provide for the volumetric dimension 64. The force and pressure of the fluid from the outlet port 15 acts upon a face forming the top area of the marginal portion 66 of the poppet valve member 20.

Thus, as shown in FIG. 1, a flow path is established continuously between the outlet port 15 and the groove 62. This flow path is extended to the inlet port 14 via a port 68 in the spool portion 22 and which port 68 is in direct communication with the passageway 35 in the pilot valve member 21 but only upon the piston portion 23 of the member 18 being displaced relative to the poppet valve member 20. In other words, the groove 62 must be uncovered from the piston portion 23 in order to extend such flow path to the port 68, passageway 35, and inlet port 14.

Figure 2:
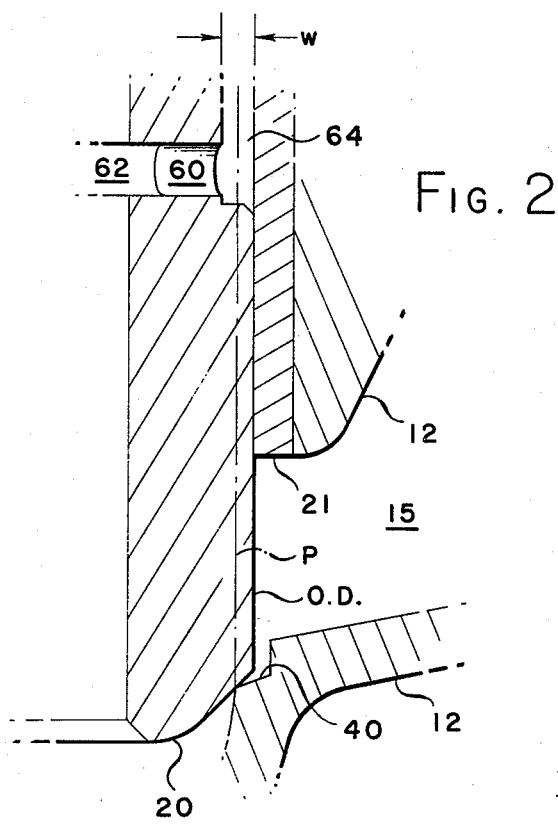
FIG. 2 is a fragmentary exploded view of FIG. 1.

In the construction of the device 10, and as best shown in FIG. 2, each of the peripheral points of the nose or surface 39 of the poppet valve member 20 which engage the valve seat 40 are coincident with a vertical plane P passing through such a point and through the width $w$ of the volumetric dimension 64.

Figure 3:
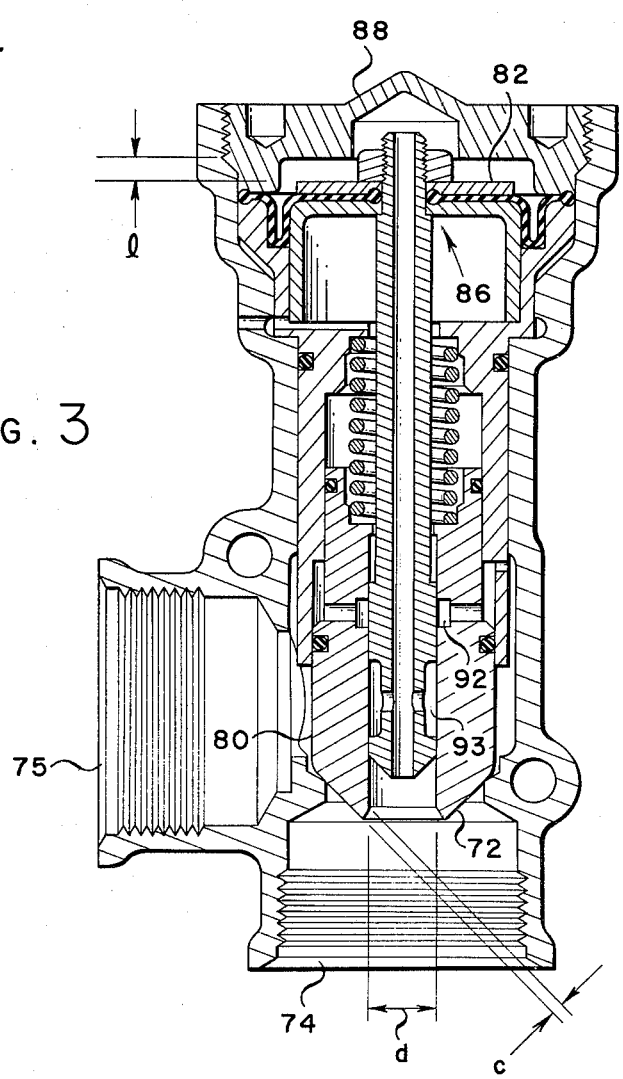
FIG. 3 is a modified embodiment of the invention.

FIG. 3 illustrates modifications within the scope and spirit of the invention and which may in particular applications of the device 10 add distinct advantages in its utilization. The stroke of the spool portion 72 may be changed, such as by reducing its length, in order to maintain a control of a desired flow of fluid from the outlet port 75 to the inlet port 74. Also, damping may be effected by increasing the outside or end diameter $d$ of the spool portion 72. A sudden pressure build-up would occur at inlet port 74, normally causing the poppet member 80 to snap shut into the closed position shown in FIG. 3. A continued application of vacuum at the inlet port 74 would cause the poppet valve member 80 to snap open, and to travel its total displacement, return to closed position, etc., all causing a poppet "chatter." To overcome the chatter, as the non-stationary surface 82 of the sensing means 86 is forced upwardly towards or against the closure or retainer member 88, the poppet valve member 80 assumes a position such that a flow path condition is established between the groove 92 and a cutaway recess 93 in the spool stem, to bleed off the fluid from the outlet port 75. At this point in time, the valve seat-to-poppet clearance $c$ is only at most a substantial portion of the linear distance $l$.

By the construction of the embodiment shown in FIG. 3, chattering and hystereses in the operation of the subject matter of the invention is obviated or eliminated.

The usual operation of the device 10 occurs upon a normal actuation of, say, the landing gear of an aircraft. The device 10 is disposed in the hydraulic return line. The normally closed poppet valve member 20 is in sealing contact with its valve seat 40 prior to actuation. Upon such actuation, the flow of fluid in the hydraulic line to which the device 10 is connected passes through the inlet port 14 directly to the outlet port 15, the pressure in the line disengaging the poppet valve member 20 from its valve seat 40. The pressure differential applied to the sensing assembly 26 is such as to maintain it and the pilot valve assembly 18 in their downward position while the poppet valve member 20 compresses its biasing spring 42. In other words, the pressure in the line to port 14 is transmitted through the passageway 35 to the upper cavity of the chamber 32 while atmospheric or exterior pressure, being of lesser value, is being transmitted through the vents 36, 37 to the lower cavity of the chamber 32. This condition is normal in the operation of the line during, say, the controlled lowering or raising of an aircraft's landing gear apparatus through its hydraulic actuating system.

Assume now that a cavitation or vacuum develops in the hydraulic system apparatus for the aircraft's landing gear. The diaphragm 27 of the sensing assembly 26 senses a change in the pressure differential in chamber 32, as a result of a negative pressure effect occurring in the upper cavity. The atmospheric pressure will cause the sensing assembly 26 to actuate its connected pilot valve assembly 18 by moving it upwardly. The groove 62 is uncovered from the piston portion 23 of the pilot valve assembly 18, thus establishing the extension of the indicated flow path to the inlet port 14 via the passageway 35. Immediately, the poppet valve 20 disengages from its valve seat 40 to provide a reverse flow of fluid from outlet port 15 into inlet port 14.

The theory of such operation is as follows. The pressure in the volumetric dimension 64 is the same as that existing in the outlet port 15 prior to unseating of the poppet valve member 20. When the diaphragm 27 senses a change in pressure differential as a result of the negative pressure occurring, the diaphragm 27 and pilot valve assembly 18 rise, and the pressure in the volumetric dimension 64 is "dumped" into through the opening 60 and groove 62 into the annulus defined between the bore 24 and the necked down portion of the pilot valve below the piston 23 for return to the inlet 14 at a faster rate than the flow of fluid from the outlet port 15 into the smaller orifice 58 can re-establish in the dimension 64. Thus, it may be said that this "control" pressure in the volumetric dimension 64 is vacuum released. The total residual force of the spring 42 and that in the volumetric dimension 64 on the face of the marginal portion 66 of the poppet valve member 20, is less than the force being applied to the poppet valve member 20 at its point of engagement to the valve seat 40. This applied force at the valve seat 40 is measurable on the portion of the face 69 (FIG. 2) of the member 20 which extends from such valve seat point to the outer diameter (O.D., FIG. 2) of the poppet valve member 20 and is equivalent to the force generated by the pressure in the outlet port 15 to which the portion of the face 69 is exposed. Thus, the popper valve member 20 disengages from its valve seat 40.

In the event of a rupture in the hydraulic line to the primary (inlet) side 14 of the device 10, the poppet valve remains seated or is immediately seated on the valve seat 40. A loss in pressure is sensed by the sensing diaphragm 27, and no less than atmospheric pressure is introduced into the upper cavity of the chamber 32. The "control" pressure in the volumetric dimension 64 cannot escape, and is equal to the pressure in outlet port 15 upon the valve seat 40. Therefore, the poppet valve seats on or engages the valve seat 40.

Assembly of the device 10 should be readily apparent, however, briefly, the pilot valve extension 25 is inserted through the bore 24 of the poppet valve member 20. The spring 42 is introduced into the valve guide 21 after which the assembled elements 18 and 20 are introduced thereinto and the diaphragm assembly 27 thereinto and the diaphragm assembly 27 secured to the pilot valve extension 25. This entire sub-assembly may then be introduced into the housing 12 after which the closure or retainer member 28 is tightly threaded thereto. The O-rings 50 are slipped onto their respective elements at expeditious points of assembly of the device 10.

It will be understood that modification may be made in the design and arrangement of the parts or elements without departing from the scope or spirit of the invention.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what we claim as patentably novel is:

1. A check valve comprising in combination
 a housing,
 a valve seat in said housing,
 an inlet port and an outlet port for said housing,
 a poppet valve member slidably mounted in said housing and having a surface engageable with said valve seat,
 said surface being exposed to said outlet port upon seating on said valve seat,
 a pilot valve assembly slidably mounted in said poppet valve member,
 a sensing means cooperatively connected to said pilot valve assembly,
 said housing including a chamber, said sensing means being disposed and retained therein and thereby forming first and second cavities in the chamber one to each side of said sensing means,
 means for venting the first cavity to the inlet port and the second cavity to the exterior of said housing,
 said pilot valve assembly having a pasageway in communication with the cavity vented to said inlet port,
 means for defining a fluid flow path between said outlet port and said pilot valve assembly, and
 means in said pilot valve assembly for connecting said defining means with said inlet port.

2. The check valve of claim 1 wherein said defining means includes an arrangement of openings in said housing, poppet valve member, and pilot valve assembly adapted to provide for continuous communication from said outlet port to said pilot valve assembly,
 a volumetric dimension being formed thereby and being in cooperative relationship to said poppet valve member.

3. The check valve of claim 1 wherein said pilot valve assembly includes a spool portion, a piston portion, and an extension on said piston portion, said sensing assembly being secured to said extension,
 said connecting means being disposed in said spool portion and communicating with said passageway.

4. The check valve of claim 1 wherein said defining means comprises
 an interior annular groove and hole in communication therewith both being in said poppet valve member,
 a guide member retained in said housing and in which said poppet valve member is reciprocably mounted,
 an orifice in said guide member,
 an annulus formed in the interior wall of said housing,
 a conduit in said housing connecting said outlet port to said annulus,
 said guide member and poppet valve member having cutaway portions forming a volumetric dimension between said poppet valve member and guide member, said volumetric dimension being in cooperative relationship to said poppet valve member,
 said hole being of a greater size than said orifice.

5. The check valve of claim 1 wherein said connecting means comprises a port in said pilot valve assembly, said port communicating with said passageway.

6. In a check valve including inlet and outlet ports, a sensing means in a chamber of the check valve, a poppet valve member having a surface engageable with a valve seat,
 the improvement comprising
 a portion of said surface being exposed to the outlet port upon the valve seat being engaged,
 a pilot valve assembly slidably mounted in said poppet valve member and actuatable by said sensing means,
 said pilot valve including a spool portion, a piston portion spaced from said spool portion, and an extension mounted on said piston portion, said sensing means being secured to said extension at an end of said pilot valve opposite said spool portion,
 means including a volumetric dimension defining an arrangement of openings between the outlet port and said pilot valve assembly,
 said volumetric dimension in cooperative relationship to said poppet valve member, and
 means for extending said defining means to the inlet port through said pilot valve assembly.

7. The check valve of claim 6 wherein said spool portion is shortened in its length for maintaining a desired flow of the fluid through said defining means.

8. The check valve of claim 6 wherein the outside diameter of said spool portion is increased to effect a damping on said check valve.

9. The check valve of claim 6 wherein said defining means comprises

- an interior annular groove and hole in communication therewith both being in said poppet valve member,
- a guide member retained in said housing and in which said poppet valve member is reciprocably mounted,
- an orifice in said guide member,
- an annulus formed in the interior wall of said housing,
- a conduit in said housing connecting said outlet port to said annulus,
- said guide member and poppet valve member having cutaway portions forming the volumetric dimension between said poppet valve member and guide member,
- said hole being of a greater size than said orifice.

* * * * *